United States Patent [19]
Cavicchi et al.

[11] 3,860,358
[45] Jan. 14, 1975

[54] TURBINE BLADE TIP SEAL
[75] Inventors: Allen W. Cavicchi; Gabor T. Ketting, both of Manchester, Conn.
[73] Assignee: United Aircraft Corporation, East Hartford, Conn.
[22] Filed: Apr. 18, 1974
[21] Appl. No.: 462,152

[52] U.S. Cl. ................. 415/174, 415/170, 277/26, 415/134
[51] Int. Cl. ........................ F01d 11/08, F02c 7/28
[58] Field of Search ............ 415/170 R, 171, 172 A, 415/173, 174, 134, 136, 137, 138; 277/26, 96 A, 149, 158, 160

[56] References Cited
UNITED STATES PATENTS
| | | | |
|---|---|---|---|
| 3,146,992 | 9/1964 | Farrell | 415/174 |
| 3,583,824 | 6/1971 | Smuland et al. | 415/174 |
| 3,594,010 | 7/1971 | Warth | 415/170 |

FOREIGN PATENTS OR APPLICATIONS
| | | | |
|---|---|---|---|
| 1,286,810 | 1/1969 | Germany | 415/136 |

*Primary Examiner*—C. J. Husar
*Assistant Examiner*—L. J. Casaregola
*Attorney, Agent, or Firm*—Robert C. Walker

[57] ABSTRACT

In a gas turbine engine a seal which minimizes blade tip clearance at a design operating condition is disclosed. In the cold engine condition the radius of curvature of the sealing surface is less than the radius of the turbine wheel at the blade tips. At the design operating condition the radius of curvature of the sealing surface is substantially equal to the wheel radius. The seal is supported by arcuate hooks which are sufficiently flexible to accommodate the changes in the radius of curvature of the sealing surface over the indicated range.

4 Claims, 4 Drawing Figures

3,860,358

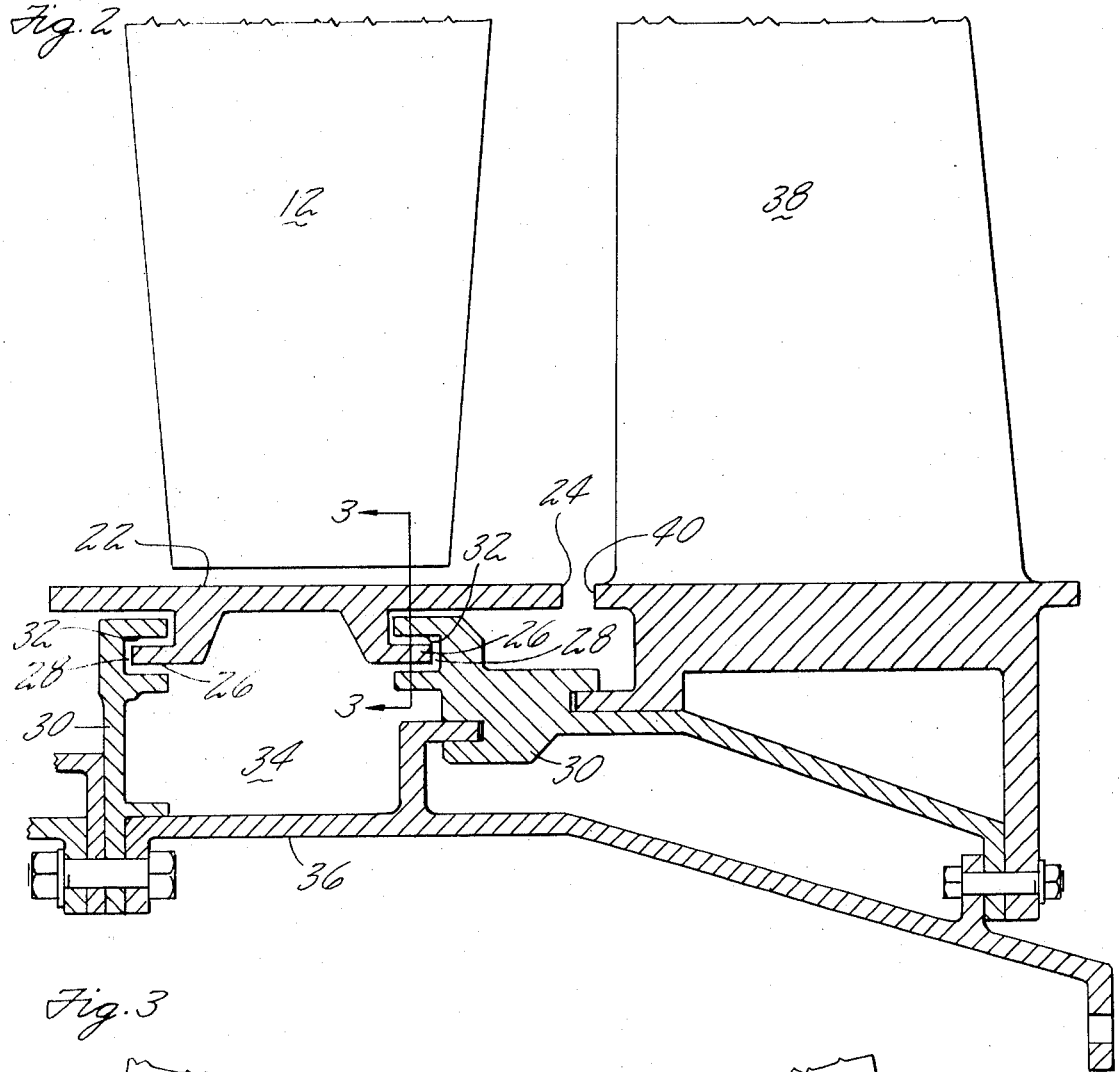
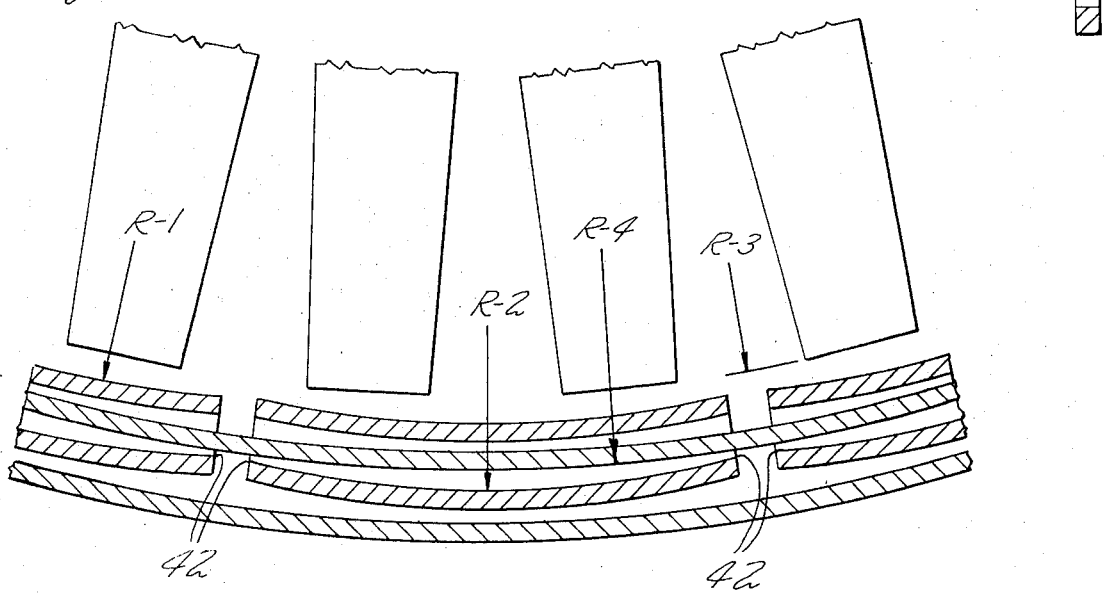

TURBINE BLADE TIP SEAL

BACKGROUND OF THE INVENTION

1. Field of the Invention

The present invention relates to gas turbines and more specifically to blade tip seals for use in high temperature gas turbine engines.

2. Description of the Prior Art

The construction of gas turbine engines has always required precise engineering to ensure structural integrity of individual components and maximum aerodynamic performance of the engine. In order to achieve maximum performance, the entire working medium must be directed across the turbine blades. When leakage occurs between the turbine blades and the enclosing structure, corresponding performance losses occur.

In a typical gas turbine engine construction the turbine blades are enclosed by blade tip seals which are segmented to accommodate thermal expansion. As shown in U.S. Pat. No. 3,423,070 to Corrigan, two legs extending from each seal segment engage circumferential tracks in support members attached to the turbine case. Clearance between the legs and the circumferential tracks is small in order to accurately position the seal with respect to the blade tips and to minimize vibratory stresses. Commonly a cavity beneath the segmented seal is pressurized to direct the seal toward the engine centerline thereby forcing the legs on the segmented seal into contact with the inner diameter of the circumferential track. As long as surface contact between the leg and the circumferential track is maintained, the segmented seal is stably supported.

When the engine reaches it operating temperatures, the surface of the segmented seal is exposed to hot turbine gases and the leg portions of the seal are exposed to lower temperature pressurizing air. The thermal gradient thus established across the segmented seal results in the thermal growth of the sealing surface exceeding that of the legs thereby flattening the segmented seal. As the seal flattens, each leg becomes distorted within the circumferential track and contacts the track at several points on its inner and outer diameters binding the segmented seal into the circumferential track.

Although a bound seal is stably supported, the above described seal construction has several detrimental features. Principally, the segmented seal must be free to axially reposition itself so that its downstream edge contacts the upstream edge of adjacent turbine vanes to effect a radial gas path seal. If the segmented seal is bound within the circumferential track the seal will not axially reposition. Also, thermal warping of the legs brings the legs into contact with the inner and outer diameters of the circumferential track. Once contact is established, further thermal distortion increases stresses within the legs and may result in fracture or yielding of the leg material. If the leg material structurally yields it will be difficult to dismantle and reassemble within the circumferential track.

In one embodiment the legs are provided with stress relief slots so that thermally deformed seals will not become overstressed as they bind up in the circumferential tracks.

In another embodiment the clearance between the circumferential track and the legs of the segmented seals is increased to eliminate binding. As a thermal gradient is established between the seal surface and the legs, the seal flattens, thereby terminating surface contact between leg and the circumferential track. The seal becomes supported at only one location and is subject to a rocking action within the track. In this unstably supported state vibratory stresses induced by passing blade tips may destroy the seal segment. In addition, performance may be significantly decreased as irregular wear patterns caused by the rocking motion increase the clearance between the blade tip and the seal segment.

Historically, both gas turbine and steam turbine engines have contained sealing surfaces with a cold condition radius of curvature approximately equal to the radius of the corresponding sealed part.

In the steam turbine large initial clearance between the sealing member and a rotating shaft must be provided to accommodate case misalignment before the turbine reaches its operating temperatures. U.S. Pat. No. 3,594,010 to Warth discloses a two position segmented seal for sealing a shaft wherein a sealing surface having a constant radius of curvature is positioned at one of two differing diameters on its support. During engine run up the seal is held in one position away from the shaft by the spring member to prevent rubbing contact between the shaft and the gland seals. When sufficient differential pressure between the two stages sealed by the gland seal occurs, the seal, being pressurized from its back side, is forced in the second position against the inner diameter of a circumferential track. The seal has two projections which enclose the spring space. As the seal is urged by differential pressure against the inner diameter of the circumferential track, the seal comes to rest on the two projections thereby holding the seal in a stable condition, the sealing surface being at its minimum diameter.

The steam turbine shaft seal suggested by Warth is not suited to gas turbine blade sealing because the blades passing a Warth type seal in its retracted position would induce vibratory stresses not generated by the smooth shaft which is sealed by the Warth invention. The vibratory stress would ultimately cause a fracture of the seal member.

In modern gas turbines an alternate method of providing a sealing surface having a variable diameter at different engine conditions is required. Additionally the seal must be stably supported during all conditions of operaton.

SUMMARY OF THE INVENTION

A primary object of the present invention is to provide a turbine blade tip seal having reduced tip clearance at a design engine operating condition. A further object of the invention is to provide a seal support which is stable during all engine operating conditions.

The present invention is predicated upon the recognition that thermal gradients across a seal induce flexing forces useful in establishing new radii of curvature of the sealing surface. The thermal conditions at the seal surface promote greater thermal expansion than that experienced at the arcuate hooks, thereby increasing the seal surface area with a corresponding increase in the radius of curvature. According to the present invention a turbine blade tip seal having a sealing surface with a variable radius of curvature is stably supported in a radial direction within a circumferential track by an arcuate hook on the seal.

One feature of the present invention is the sealing surface which has a radius of curvature in the cold engine condition which is less than the radius of the turbine wheel at the blade tips. Another feature of the present invention is the arcuate hook on the seal which has a radius of curvature less than the radius of curvature of the circumferential track engaged by the hook. A sealing surface on the downstream edge of the segmented seal and the radial clearance between the seal and the circumferential track are additional features.

A principal advantage of the present invention is the improved control of blade tip clearance provided by the thermally flexing seal as the radius of curvature of the sealing surface increases to match the radius of the blade of the turbine wheel at the blade tips during a design operating condition. An additional advantage of the present system is the freedom of the seal to axially reposition with respect to downstream vane platforms thereby effecting radial gas path sealing between the seal and adjacent vane platforms. Also, a stable seal support is provided by two line contact between the inner diameter of the supporting circumferential track and the arcuate hook.

BRIEF DESCRIPTION OF THE DRAWING

FIG. 2 is a simplified cross section of a portion of a gas turbine engine showing a turbine blade and vane.

FIG. 3 is a simplified view taken along the line 3—3 as shown in FIG. 2.

DESCRIPTION OF THE PREFERRED EMBODIMENT

Figure 1:
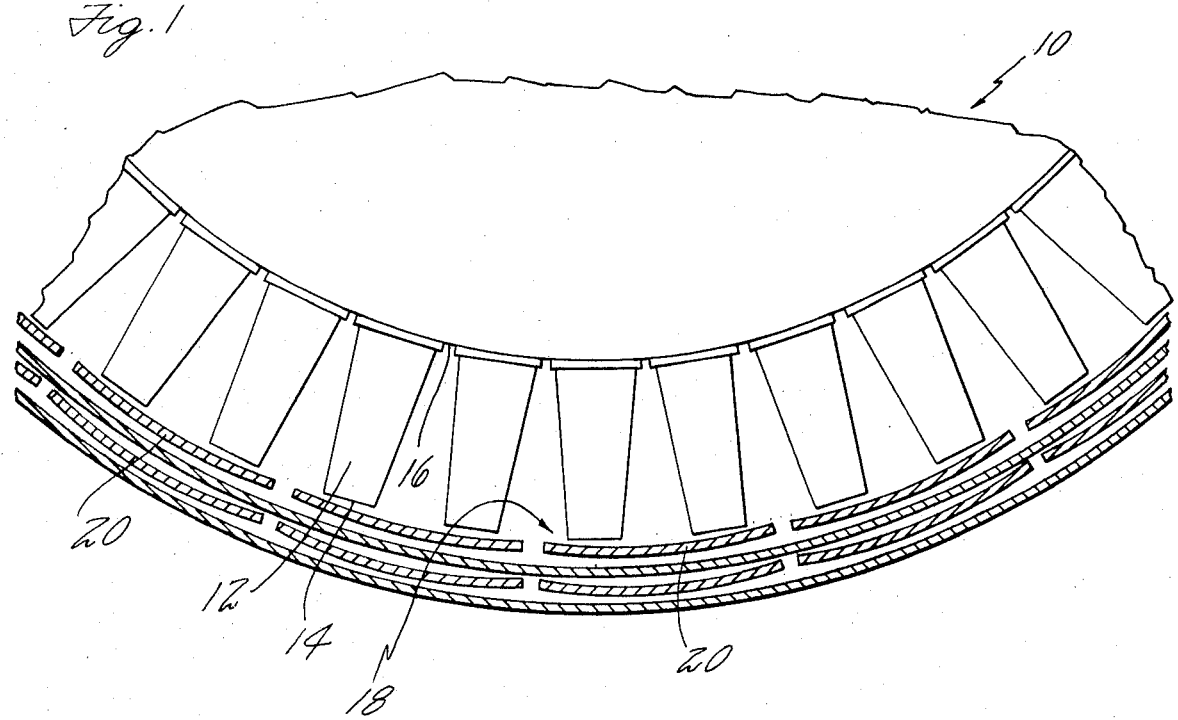
FIG. 1 is a simplified end section taken through the turbine of a gas turbine showing a gas seal in the cold condition.

A simplified end section taken through the turbine portion of a gas turbine engine 10 is shown in FIG. 1. A plurality of turbine blades 12 each having a blade tip 14 are attached to a wheel assembly 16. An outer air seal 18 comprising seal segments 20 surrounds the blade tips.

Referring to FIG. 2 each seal segment has a blade sealing surface 22 and a vane sealing edge 24 and is supported by a pair of arcuate hooks 26 extending from the seal segment. Each arcuate hook engages a circumferential track 28 within a seal support 30, the circumferential track having an inner diameter surface 32. An annular cavity 34 located between the outer air seal and a turbine case 36 is axially bound by the seal supports. A turbine vane 38 having an upstream platform edge 40 is supported from the turbine case.

The sealing surface of each seal segment shown in FIG. 3 has a radius of curvature R–1 and each arcuate hook has a radius of curvature R–2. Each arcuate hook has a support area 42 at each end. A turbine wheel radius R–3 extends from the engine centerline to each turbine blade tip. The inner diameter surface of the circumferential track has a radius of curvature R–4.

During engine operation the annular cavity is pressurized thereby forcing the seal segments toward the engine centerline until the support points contact the inner diameter surface of the circumferential track where the seal segment is held through all engine operating conditions. Differential pressure between successive turbine stages forces the seal segment axially downstream until the vane sealing edge comes to rest against the platform edge of an adjacent turbine vane.

Figure 4:
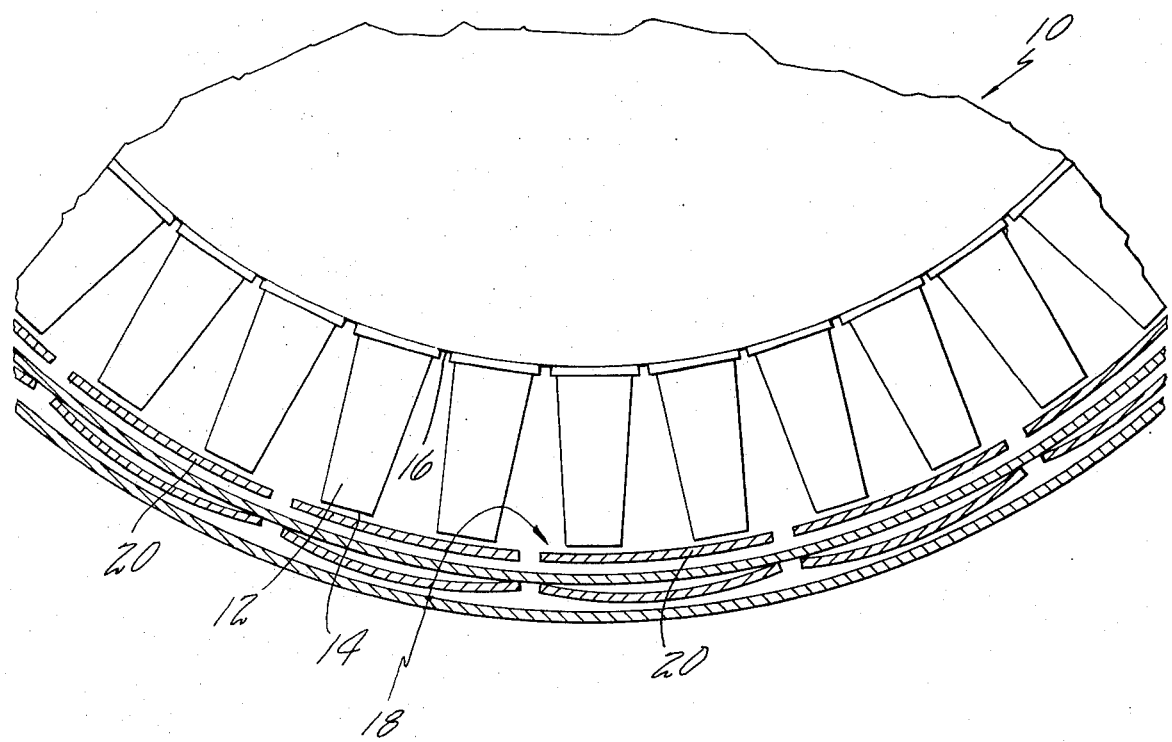
FIG. 4 is a simplified end section taken through the turbine of a gas turbine engine showing a gas seal in the cruise condition.

In the cold engine condition the radius of curvature R–1 of the sealing surface is smaller than the wheel radius R–3 within which the turbine blades rotate. The radius of curvature of the sealing surface is selected such that it will be substantially equal to the radius of the turbine blade tips at a design engine operating condition as is shown in FIG. 4. In one preferred embodiment at cruise condition the temperature at the sealing surface is 1,300°F and the temperature at the support hooks is 950°F. The temperature gradient across the seal forces the seal surface to flatten thereby increasing the radius of curvature of the sealing surface. As the seal surface flattens, the arcuate hook also flattens. The radius of curvature R–2 of each arcuate hook is selected such that it will always be smaller than the radius of curvature R–4 of the inner diameter surface of the circumferential track thereby insuring that the arcuate hook contacts the inner diameter of the circumferential track at the two support areas. The two point support prevents rocking of the seal and stabilizes the seal at all engine operating conditions. Sufficient clearance is provided between the arcuate hook and the circumferential track so that the seal remains free to axially reposition.

It is essential to the present invention that the seal arcuate hook not inhibit flexure of the sealing surface. The arcuate hook being of uniform cross section and minimum thickness, has maximum flexibility while equally distributing thermal stresses.

Although the invention has been shown and described with respect to preferred embodiments thereof, it should be understood by those skilled in the art that the foregoing and other changes in the form and detail thereof can be made without departing from the spirit and the scope of the present invention.

We claim:

1. In a gas turbine engine which includes a turbine wheel comprising a disk and a plurality of blades radially extending from the disk, an outer case having a circumferential track at a radius greater than the radius of the wheel at the tips of the blades, and a gas seal comprising seal segments which are positioned with respect to the case track and which radially enclose the wheel to reduce gas leakage across the wheel between the case and the tips of the blades wherein the improvement comprises:

an arcuate hook which extends from each seal segment and has a radius of curvature less than the track radius, the hook engaging the track along two lines of contact to position each seal segment with respect to the case track.

2. In a gas turbine engine which includes a turbine wheel comprising a disk and a plurality of blades radially extending from the disk, an outer case having a circumferential track at a radius greater than the radius of the wheel at the tips of blades, and a gas seal comprising seal segments which are positioned with respect to the case track and which radially enclose the wheel to reduce gas leakage across the wheel between the case and the tips of the blades wherein the improvement comprises:

a sealing surface on each seal segment which has a surface radius of curvature during the cold engine condition which is less than the radius of the wheel at the blade tips and a surface radius of curvature at an operating condition which is substantially equal to the radius of the wheel at the blade tips; and an arcuate hook which extends from each seal segment and has a radius of curvature less than the track radius, the hook engaging the track along two lines of contact to position each seal segment with respect to the case track.

3. Apparatus for reducing gas leakage between the stages of a gas turbine engine, comprising:
   a turbine wheel having a plurality of turbine blades extending radially from the disk and having a wheel radius R-3 between the engine centerline and the tips of the blades;
   a turbine case which radially encloses the wheel and has a circumferential track with a radius R-4; and
   a blade tip seal which is circumferentially segmented and concentrically positioned about the wheel internal to the case and wherein each segment having a sealing edge on the downstream end comprises,
   an arcuate sealing surface having a radius of curvature in cold engine conditions which is less than the radius R-3 and a radius of curvature in normal operating conditions which is substantially equal to the radius R-3; and
   an arcuate hook having a radius of curvature R-2 which is less than the radius R-4 during all engine conditions, the arcuate hook engaging the circumferential track in the case.

4. The invention according to claim 3 further including a plurality of turbine vanes located downstream from the blades, each vane having a platform section with an upstream edge which cooperates with the downstream edge of the adjacent seal segment during engine operation to reduce gas leakage in the radial direction between the seal and the vane.

* * * * *